United States Patent [19]

Le Chatelier

[11] Patent Number: 5,190,247
[45] Date of Patent: Mar. 2, 1993

[54] ARRANGEMENT OF A ROTARY APPARATUS FOR LANDING GEARS

[75] Inventor: Robert Le Chatelier, Reuil Malmaison, France

[73] Assignee: Labinal, société anonyme, France

[21] Appl. No.: 736,501

[22] Filed: Jul. 26, 1991

[30] Foreign Application Priority Data

Aug. 2, 1990 [FR] France ................................. 90 09892

[51] Int. Cl.⁵ ............................................. B64D 43/00
[52] U.S. Cl. ................................. 244/103 R; 310/168; 310/67 R; 188/264 AA; 73/146.5; 73/494
[58] Field of Search ............ 244/100 R, 103 R, 103 S, 244/111, 1 R; 188/264 AA, 264 R; 310/90, 168, 169, 171, 170, 75, 66, 67 R, 62; 308/189.1, 207.1; 73/146.5, 494; 340/448

[56] References Cited

U.S. PATENT DOCUMENTS

| | | |
|---|---|---|
| 2,414,859 | 1/1947 | Demaline ........................ 244/103 S |
| 2,899,005 | 8/1959 | Speicher ............................ 310/67 R |
| 3,301,357 | 1/1967 | Cussons et al. .............. 188/264 AA |
| 3,783,316 | 1/1974 | Madigan ................... 310/168 |
| 3,851,199 | 11/1974 | Apsit et al. ........................... 310/168 |
| 4,013,954 | 3/1977 | Deem et al. ......................... 310/168 |
| 4,134,054 | 1/1979 | Akamatsu ........................... 310/168 |
| 4,475,075 | 10/1984 | Munn ............................... 310/67 R |
| 4,544,855 | 10/1985 | Prenner et al. ....................... 310/62 |
| 5,049,769 | 9/1991 | Reinhardt et al. ................. 310/67 R |

Primary Examiner—Galen Barefoot
Attorney, Agent, or Firm—Larson and Taylor

[57] ABSTRACT

The arrangement of a rotary apparatus for aircraft landing gears comprises, disposed in an aircraft wheel axle a modular assembly in one unit comprising a stator and a rotor which is mounted in the stator by two rolling bearings, the stator and the rotor being respectively divided into two stator parts and two rotor parts forming a genetachometer and an electromagnetic coupling of the rotating transformer type for sensors carried by the wheel.

20 Claims, 3 Drawing Sheets

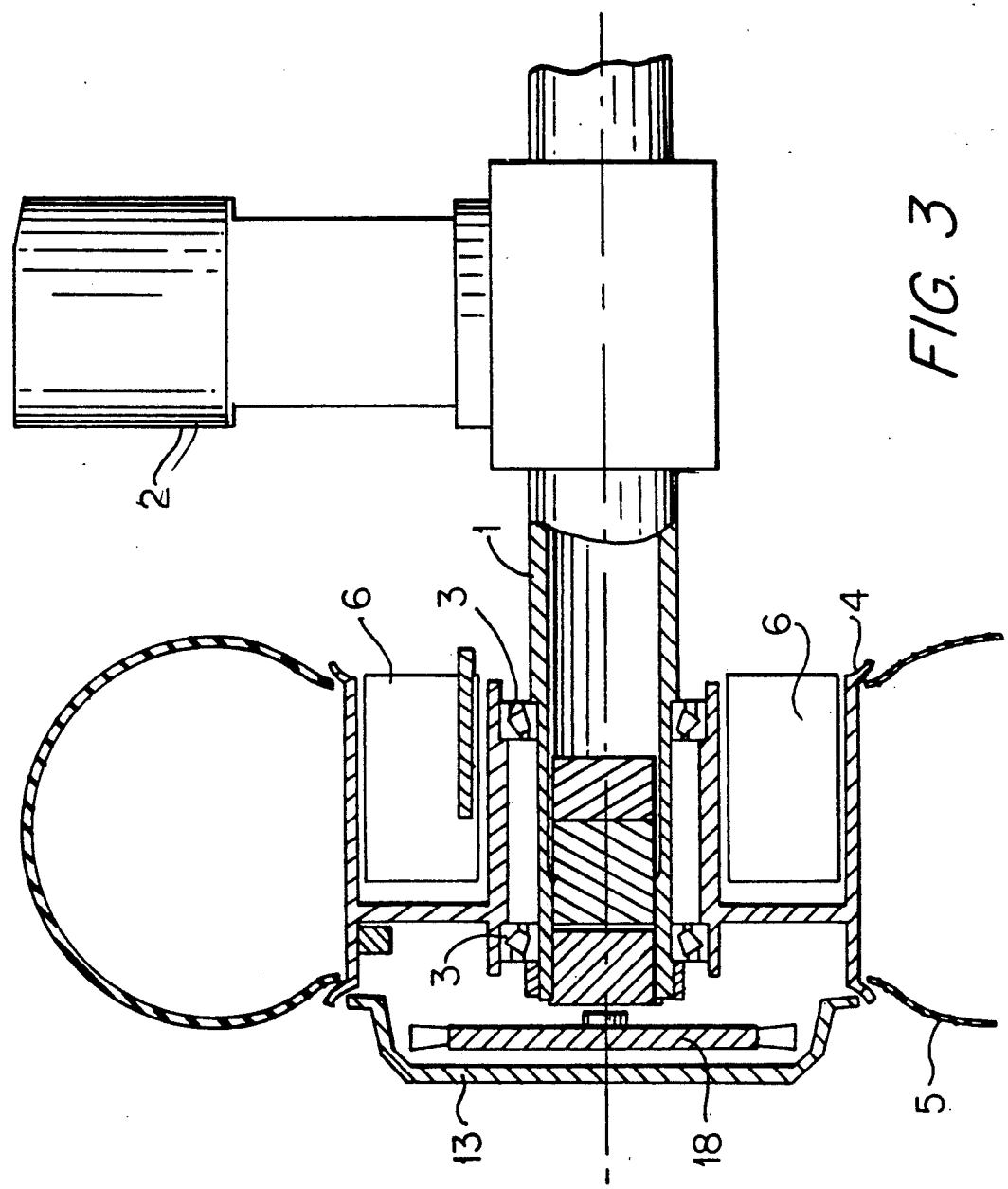

ARRANGEMENT OF A ROTARY APPARATUS FOR LANDING GEARS

The present invention relates to an arrangement of rotary apparatuses for aircraft landing gears.

Landing gears for modern aircraft comprise apparatuses or devices having rotating parts, for example carried by the wheel or more usually by the axle of the wheel or driven by the wheel or its axle. Among these devices there is found in particular a genetachometric device which generates a signal indicating to the pilot the speed of the aircraft on the ground, which device is obligatory in airline aircraft. Further, a wheel brake fan and its driving motor are also often provided. Lastly, coupling means are increasingly frequently provided for the detection and monitoring of the wheels and in particular of the pneumatic tires of the wheels adapted to transmit to exploiting means in the cockpit data as to pressure or temperature of the tires. Other elements are often present in this region, such as for example brake temperature sensors.

The presence of elements of this apparatus in the region of the axle of the landing gear within a small available volume presents the problem of the arrangement of the various components.

In general, efforts have been made to overcome these drawbacks by an arrangement in which the stator part of the genetachometer is rendered unitary with the peripheral stator part of a rotating transformer constituting coupling means, such as described for example in the French patent FR-A-2,497,342, the rotor part of the coupling means, i.e. the secondary part of the rotating transformer, being driven by means of an eccentric finger member of the wheel cowl which is inserted into a driving recess in the rotor part, whereas the rotor part of the genetachometer is driven by an axial extension of the wheel connected to the shaft of the genetachometer by a coupling disposed in the throughway axial volume within the rotor part of the coupling means.

In the case where the arrangement further comprises a wheel brake fan, it is the stator of the motor of the fan which is rendered unitary, either directly or indirectly, with the stator part of the coupling transformer, while the genetachometer is disposed on the other side of the fan motor with respect to the coupling transformer, the axial extension for driving the genetachometer, carried by the wheel cowl, then extending through in succession the rotor part of the coupling transformer and the rotor part of the motor of the fan, this motor of the fan driving the fan through a hollow shaft allowing the passage of said extension.

In any case, a complex installation results which is difficult to mount and dismantle and therefore complicates maintenance. Further, a rather large number of component parts, each having a specific shape, must be employed, which increase the cost, the weight and the complexity of the assembly.

An object of the invention is to overcome these drawbacks and to provide an arrangement of a rotary apparatus for a landing set of wheels which is simple, easy to mount and dismantle and therefore permits great economies in maintenance.

Another object of the invention is to provide such an arrangement which may be mounted and dismantled as a single unit.

Another object of the invention is to provide such an arrangement which permits, by a modular construction, providing, or not providing, as desired, certain items of the apparatus without this requiring any special adaptation.

The invention therefore provides an arrangement of a rotary apparatus for aircraft landing gears, of the type comprising, disposed in an aircraft wheel axle, an assembly in one unit comprising in succession, from the end of the axle, two stator parts having substantially the same diameter and two corresponding inner rotor parts connected in rotation, the outermost rotor part comprising means for driving it in synchronism, directly or through a coupling, by a part of the wheel, such as for example the wheel cowl.

One of the stator parts of the assembly thus defined is constituted by the genetachometric stator part in which is rotatable the corresponding rotor part which is rotatively mounted inside said genetachometric stator part, the other stator part being constituted by the stator of the rotating coupling transformer.

Advantageously, the outside dimensions and preferably the inside dimensions of two stator parts are the same and preferably the outside dimensions of the rotor parts are also identical to each other.

The assembly according to the invention, which comprises two stators in a single unit, may, as the case may be, comprise a single rotor on which are mounted the various windings and rotor devices of both the coupling transformer and the genetachometric rotating part. Instead of a single rotor there may also be provided two rotors in the extension of each other and drivingly interconnected by being either firmly coupled or interconnected by one or more driving finger members or other coupling means.

It is preferred that the rotor be in a single unit or that the two rotor parts be firmly interconnected, since the rotor arranged in this way can then be mounted inside the double stator by using only two rolling bearings.

The rotor may be driven by an axial or eccentric coupling fixed to a wheel element, such as the wheel cowl.

In the case where a wheel brake fan is also provided, it is preferred that the two aforementioned rotor parts define an axial passage through which may extend a wheel brake fan driving shaft which is coupled, at its inner end remote from the fan, to the rotor of the fan motor whose stator is advantageously connected to a stator part of the assembly according to the invention.

Of course, it is still within the scope of the invention when there is employed, in the arrangement according to the invention, the genetachometer alone, the stator part and the rotor part of the coupling means being removed, and it is preferred that the assembly be so arranged that the genetachometric part of the assembly is located at the end of the axle adjacent to the wheel, the arrangement according to the invention then extending more or less deeply into the axle, depending on the absence or the presence of the coupling transformer and/or the fan motor.

It will be understood that it is in this way possible to construct an arrangement of modular elements in a single unit comprising the genetachometer which is either alone or associated with the coupling transformer, to which may be fixed the fan motor, or associated directly with the fan motor if the coupling means is absent.

Means may be advantageously used for connecting the stator parts, whereby it is possible to connect indifferently, the stators to the coupling means, the genetachometer and the fan motor.

It will be understood that it is easy to assemble the various elements of the arrangement and to dispose and fix the arrangement in the axle in a single operation. Further, with the same means, it is possible to employ only one apparatus, that is, the genetachometer, or two associated apparatuses or the three apparatuses associated in a single unit. Maintenance is facilitated, since the whole may be dismantled in one go. Lastly, the driving from the wheel cowl may be very easily achieved, a single finger member or driving pin being necessary, whereas the shaft of the fan is in no way hindered and remains the sole element occupying the central space in the arrangement according to the invention.

Further features and advantages of the invention will be apparent from the following description, given by way of a non-limitative example, with reference to the accompanying drawing in which:

FIG. 3 is a diagrammatic view of the assembly disposed in the region of a wheel of a landing gear.

Figure 1:
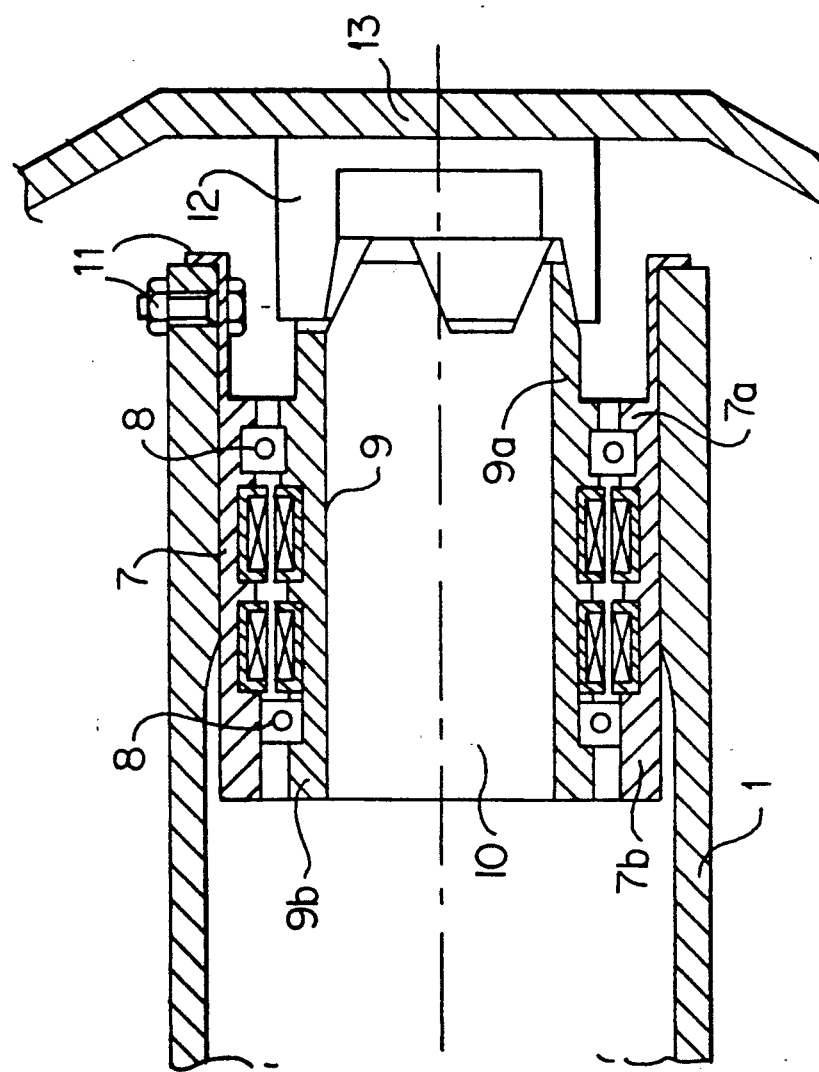
FIG. 1 is a diagrammatic view of a device according to the invention in a first embodiment.

Reference will first of all be made to FIGS. 1 and 3.

The landing gear, diagrammatically represented in FIG. 3, comprises a hollow tubular axle 1 fixed to the end of a barrel 2 of the landing gear shown diagrammatically. Mounted on the axle 1 by conventional rolling bearings 3 are wheels 4 only one of which is shown with its tire 5. A multiple disc brake 6 of conventional type in aircraft is connected to the axle 1 and capable of braking the conventional discs carried by the wheel 4. The arrangement according to the invention shown in FIG. 1 is disposed in the tubular axle and located substantially in the geometrical plane of the corresponding wheel 4.

This arrangement comprises a cylindrical stator 7 in which is rotatively mounted, by two ball bearings 8, a rotor 9 preferably defining an axial passage 10. The stator 7 is provided with positioning and fixing means diagrammatically represented at 11. It can be seen that this assembly constitutes an arrangement having a tubular outer shape which is disposed by simple translation inside the axle 1 in which, once positioned by the abutments of the means 11, the stator is fixed to the axle 1 so as to render it unitary therewith, for example by bolting.

The stator 7 is divided into two stator parts 7a, 7b, one acting as the stator of the genetachometer and the other as the stator of a rotating transformer ensuring the electromagnetic coupling between means for measuring pressure and/or the temperature of the tire and exploitation means located in the aircraft, for example in accordance with the teaching of the French patent FR-A-2,497,342.

The stator 7 may be constructed in different ways. It may be formed for example by uniting, by connection with suitable connecting means, two initially independent stators, 7a and 7b. This unit may be obtained by fixing the two stators together in the region of their adjacent ends or, for example, by mounting them in a common peripheral tubular sleeve which is inserted in the axle 1.

As a variant, the stator may comprise a single part, forming for example an electromagnetic armature and including, in the parts 7a, 7b, respective windings, on one hand, for the stator part of a rotating transformer, and, on the other hand, for the genetachometric stator part.

The rotor 9 is also subdivided into two parts 9a and 9b forming respectively a genetachometric rotor part and a primary of the coupling transformer. The rotor 9 may also either be formed by two initially distinct rotors combined into a single rotor unit, or be constructed in the form of a single rotor unit with a common ferromagnetic core on which are mounted the different electromagnetic means, magnets, windings or other means adapted to rotate in front of the corresponding means of the respective stator parts 7a, 7b. Consequently, the two rotor parts 9a, 9b always rotate in a synchronous manner.

For the purpose of driving the rotor 9 in the stator 7, mechanical driving coupling means 12 are provided which are carried by the inner surface of a wheel cowl 13, these coupling means having for example one or more finger members parallel to the geometric axis of rotation and extending into corresponding recesses in the outer end surface of the rotor part 9a. Such coupling means are then easily realized when the wheel cowl 13 is mounted on the wheel 4.

It will be understood that there is in this way constructed an arrangement whose axial mounting or dismantling is particularly rapid in a single unit by only slightly skilled personnel. The connection with the various electric conductors leading from the structure of the aircraft or the wheel may be achieved simply and rapidly, for example by plug-in connectors of conventional type.

In the case where the stator and/or rotor parts are independent, they may be easily disassembled, after having extracted the assembly according to the invention from the axle, and a defective module replaced by another.

Figure 2:
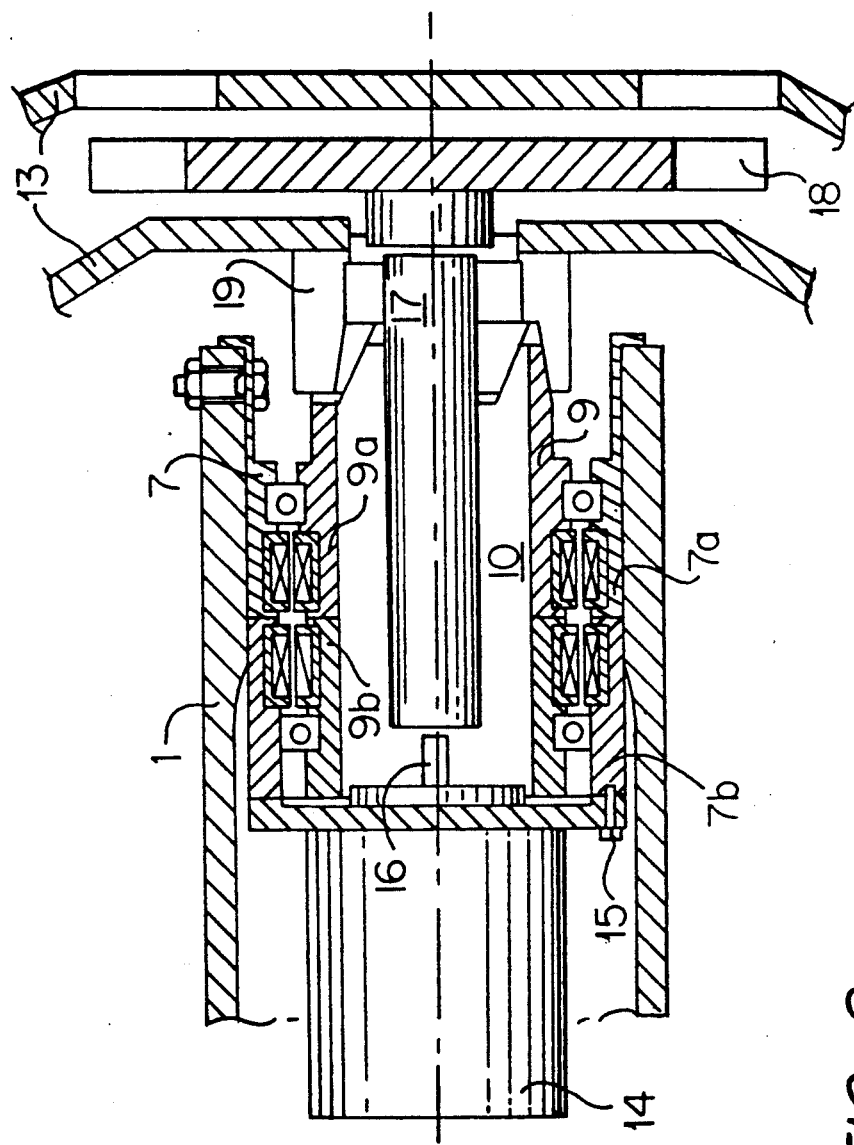
FIG. 2 is a diagrammatic view of a device according to the invention in a second embodiment.

Reference will now be made to FIG. 2.

In this embodiment, the arrangement according to the invention comprises a genetachometer-electromagnetic coupling assembly identical to that shown in FIG. 1.

The arrangement according to the invention provides a brake fan motor 14 whose case or stator is fixed by rapid fixing means, for example bolting, to the inner end of the stator 7. In this arrangement, the driving shaft 16 of the motor 14 is accessible inside the central cylindrical passage 10 and may be drivingly connected to the end of an axial shaft 17 for coupling the shaft 16 to a wheel brake fan 18 rotating within the wheel cowl 13 and ensuring in the conventional manner the cooling of the brakes 6 by the extraction of air through the cowl 13 which is suitably apertured.

In this embodiment, it will be understood that the assembly constituted by the fan motor, possibly the shaft 17 and the fan 18, and the two constituents 7, 9 of the assembly forms an arrangement in a single unit which may be inserted in or extracted from the axle 1, the electric connections being preferably achieved by connectors.

The rotor 9 is preferably driven by means of an eccentric mechanical coupling 19 carried by the wheel cowl The fixing means 15 may be preferably identical to those which connect the transformer stator 7b to the genetachometric stator 7a, so that it will be understood that it is also possible to construct a device in which the coupling transformer is omitted, the motor 14 being directly fixed to the stator 7a.

The arrangement according to the invention may also incorporate, if desired, other apparatuses, such as a temperature sensor, etc.

Although the invention has been described in respect of a particular embodiment, it must be understood that the scope of the invention is in no way limited thereto and that various formal modifications may be made therein without departing from the scope or spirit of the invention.

What is claimed is:

1. Arrangement of a rotary apparatus for an aircraft landing gear, said arrangement comprising an aircraft wheel, an axle for said wheel, an assembly in a single unit disposed in said axle and comprising, axially in succession from an end of said axle, an outermost stator part and an innermost stator part having substantially the same diameter and two inner rotor parts which correspond to said stator parts and are interconnected in rotation, one of said rotor parts being an axially outermost rotor part and the other of said rotor parts being an axially innermost rotor part, said outermost rotor part in being associated with means for driving said outermost rotor part synchronism by a part associated with said wheel, said outermost stator part being constituted by a genetachometric stator part in which said outermost rotor part is rotatable, and said innermost stator part being constituted by a stator of a coupling rotating transformer.

2. Arrangement according to claim 1, wherein said means for driving said outermost rotor part by said part associated with said wheel is a direct connection between said outermost rotor part and said part associated with said wheel.

3. Arrangement according to claim 1, wherein said means for driving said outermost rotor part by said part associated with said wheel comprises coupling means.

4. Arrangement according to claim 1, wherein said part associated with said wheel is a wheel shroud.

5. Arrangement according to claim 1, wherein said stator parts have identical sizes.

6. Arrangement according to claim 1, wherein said rotor parts define an axial passage therethrough.

7. Arrangement according to claim 1, wherein said corresponding one of said rotor parts and the other rotor part corresponding to said stator part of said coupling rotating transformer constitute a rotor which is rotatively mounted in a stator by two rolling bearings.

8. Arrangement according to claim 7, wherein said rotor is constituted by two assembled rotor parts.

9. Arrangement according to claim 7, wherein said stator is constituted by two assembled stator parts.

10. Arrangement according to claim 1, comprising a cowl for said wheel, said cowl being drivingly connected to one of said rotor parts.

11. Arrangement according to claim 6 wherein said innermost stator has an inner end comprising means for fixing a stator part of a brake fan motor.

12. Arrangement of a rotary apparatus for an aircraft landing gear, said arrangement comprising an aircraft wheel, an axle for said wheel, an assembly in a single unit disposed in said axle and comprising, axially in succession from an end of said axle, two stator parts having substantially the same diameter and two inner rotor parts which correspond to said stator parts and are interconnected in rotation, one of said rotor parts being an axially outermost rotor part and the other of said rotor parts being an axially innermost rotor part, said outermost rotor part being associated with means for driving said outermost rotor part in synchronism by a part associated with said wheel, one of said stator parts and a corresponding rotor part constituting a genetachometric apparatus and the other stator part and corresponding rotor part constituting a coupling rotating transformer, said arrangement further comprising a fan and a motor for driving said fan, said motor being fixed to one of said stator parts.

13. Arrangement according to claim 12, wherein said rotor parts define an inner passage and said motor of said fan is disposed internally in said axle and a coupling shaft extending through said passage in said rotor parts connects said motor to said fan.

14. Arrangement according to claim 12, wherein said means for driving said outermost rotor part by said part associated with said wheel is a direct connection between said outermost rotor part and said part associated with said wheel.

15. Arrangement according to claim 12, wherein said means for driving said outermost part by said part associated with said wheel comprises coupling means.

16. Arrangement according to claim 12, wherein said part associated with said wheel is a wheel shroud.

17. Arrangement according to claim 12, wherein said stator parts have identical sizes.

18. Arrangement according to claim 13, wherein said corresponding one of said rotor parts and the other rotor part corresponding to said stator part of said coupling rotating transformer constitute a rotor which is rotatively mounted in a stator by two rolling bearings.

19. Arrangement according to claim 18, wherein said rotor is constituted by two assembled rotor parts.

20. Arrangement according to claim 18, wherein said stator is constituted by two assembled stator parts.

* * * * *